United States Patent [19]

Shekleton

[11] Patent Number: 4,899,538
[45] Date of Patent: Feb. 13, 1990

[54] HOT GAS GENERATOR

[75] Inventor: Jack R. Shekleton, San Diego, Calif.

[73] Assignee: Sundstrand Corporation, Rockford, Ill.

[21] Appl. No.: 123,303

[22] Filed: Nov. 20, 1987

[51] Int. Cl.⁴ .............................................. F23R 3/00
[52] U.S. Cl. ................................ 60/39.465; 60/736; 60/753; 431/158
[58] Field of Search ................. 60/39.465, 39.12, 730, 60/736, 753; 431/160, 174, 158, 161, 162

[56] References Cited

U.S. PATENT DOCUMENTS

| | | | |
|---|---|---|---|
| 1,828,784 | 8/1927 | Perrin . | |
| 2,902,823 | 9/1959 | Wagner | 60/730 |
| 2,987,873 | 6/1961 | Fox | 60/39.465 |
| 3,077,073 | 2/1963 | Kuhrt | 60/39.465 |
| 3,379,009 | 4/1968 | Sharp et al. | 60/736 |
| 3,982,392 | 9/1976 | Crow | 60/753 |
| 3,998,581 | 12/1976 | Hemingway et al. | 431/158 |
| 4,030,875 | 6/1977 | Grondahl et al. | 60/753 |
| 4,343,605 | 8/1982 | Browning | 431/158 |
| 4,709,643 | 12/1987 | Moreno et al. | 60/753 |

Primary Examiner—Louis J. Casaregola
Assistant Examiner—Timothy S. Thorpe
Attorney, Agent, or Firm—Wood, Dalton, Phillips, Mason & Rowe

[57] ABSTRACT

Carbon build-up in a hot gas generator is avoided in a construction including a vessel 24 having a narrow inlet end 26, a narrow outlet end 28 and an intermediate, relatively wide, combustion chamber 30 by either disposing a heat shield 50 on the interior surface 48 of the combustion chamber 30 or locating a flow path 54 for coolant about the exterior surface 52 of the vessel 24, or both.

7 Claims, 1 Drawing Sheet

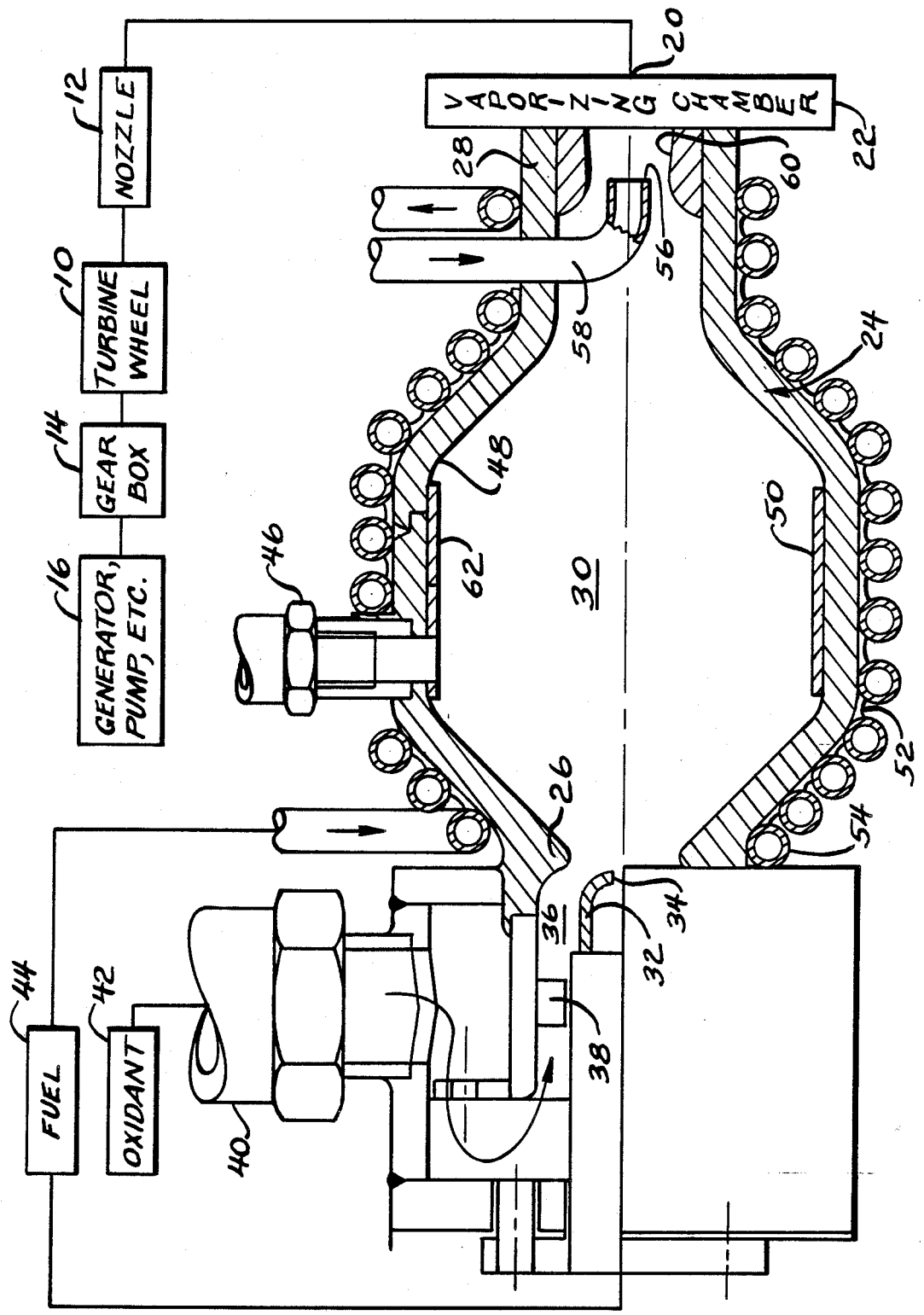

HOT GAS GENERATOR

FIELD OF THE INVENTION

This invention relates to a generator for producing hot gases as, for example, might be employed to drive a turbine wheel.

BACKGROUND OF THE INVENTION

Hot gas generators have long been utilized for producing hot gas under pressure to operate engines of various sorts as well as for other purposes. See, for example, U.S. Letters Pat. No. 1,828,784 issued Oct. 27, 1931 to Perrin which constitutes the most pertinent prior art known to the applicant.

In such hot gas generators, a carbonaceous fuel is combusted with an oxidant to produce hot gases of combustion. In addition, additional fuel may be introduced into the hot gases of combustion to be vaporized, as opposed to combusted, to increase the volume of hot gas while bringing the temperature of the combustion gas down to some desired temperature incapable of causing damage to the system in which the generator is used.

One difficulty in the operation and use of such hot gas generators is carbon build-up. Carbon build-up results when the fuel is not completely oxidized and elemental carbon is formed within the combustion chamber of the generator. It may deposit itself at various locations therein, particularly those running at relatively cool temperatures. While carbon build-up can be avoided by providing the generator with an excess of oxidant, this may result in the generation of hot spots within the vessel defining the combustion chamber causing damage thereto. Consequently, it is conventional practice to run a hot gas generator on the rich side so that all oxidant available for combustion is consumed to prevent the existence of hot spots; and this raises the potential for carbon build-up.

As pointed out by Perrin in his previously identified United States Letters Patent, it is also desirable to cool the combustion chamber to prevent damage thereto by excessive heat from combustion occurring therein. Advantageously, this is accomplished by cooling the combustion chamber with fuel. However, in the Perrin construction, there is the opportunity for excessive cooling of the combustion chamber walls; and the resulting cool spots facilitate carbon build-up when the generator is operated on the rich side as is desired to prevent the existence of hot spots.

Carbon build-up is undesirable because it may interfere with heat transfer. However, another problem resulting from carbon build-up is much more serious Specifically, such hot gas generators are frequently used to produce hot gases for driving turbine wheels. As carbon builds up, particles of the same typically break free and then flow with the hot gas through the turbine wheel. Such particulate carbon not only erodes the turbine nozzles and the turbine wheels, but it additionally can cause surge.

The present invention is directed to overcoming one or more of the above problems.

SUMMARY OF THE INVENTION

It is the principal object of the invention to provide and new and improved hot gas generator. More specifically, it is an object of the invention to provide a hot gas generator that is constructed so as to be operable on the rich side to prevent the existence of hot spots and yet avoids carbon build-up.

In general terms, the invention contemplates a hot gas generator of the sort disclosed in the previously identified Perrin patent, that is, one including a vessel having a narrow inlet end and a narrow outlet end along with an intermediate, relatively wide combustion chamber. Means are provided at the inlet end for introducing a carbonaceous fuel to be combusted into the combustion chamber generally axially of the vessel. An oxidant inlet port is concentric and disposed about the fuel introducing means and a fuel discharge port is located at the outlet end for introducing a fuel to be vaporized into the outlet end whereby such fuel is vaporized by hot gases of combustion exiting from the combustion chamber.

According to one facet of the invention, a heat shield is provided to at least partially line the interior of the combustion chamber. The heat shield protects the vessel from excessive heat from the combustion of fuel within the chamber while presenting a surface to the chamber capable of sustained operation at elevated temperatures sufficiently high to prevent carbon build-up within the vessel.

In a preferred embodiment of this facet of the invention, the heat shield is a layer of ceramic material on the interior surface of the vessel within the chamber.

According to another facet of the invention, the vessel is provided with means on its exterior surface which define a flow path for fuel acting as a coolant for the vessel. Such means provide sufficient cooling for the vessel to prevent damage thereto from heat resulting from the combustion of fuel within the chamber and yet allow the interior surface of the vessel to reach and operate at elevated temperatures sufficiently high to prevent carbon build-up within the vessel.

In a highly preferred embodiment of the invention incorporating this facet thereof, the flow path defining means comprises tubing wrapped around and in good heat exchange contact with the exterior surface of the vessel.

The invention, in its most preferred form incorporates both the aforesaid heat shield and cooling means.

And while the hot gas generator of the invention may be put to any of a variety of uses where hot gas generation is required, it is perhaps most advantageously employed in combination with a turbine wheel and eliminates erosion problems for both the turbine wheel and the nozzles typically associated therewith.

Other objects and advantages will become apparent from the following specification taken in connection with the accompanying drawings.

DESCRIPTION OF THE DRAWINGS

The FIGURE is a sectional view of a turbine system embodying a hot gas generator made according to the invention with certain components shown schematically.

DESCRIPTION OF THE PREFERRED EMBODIMENT

An exemplary embodiment of a hot gas generator made according to the invention is illustrated in the FIGURE in the environment of a turbine system including a turbine wheel 10. The turbine wheel 10 receives hot gases via a conventional nozzle 12 and is driven thereby. The rotary power output from the turbine wheel 10 is provided to a conventional gear box 14 which drives any of a variety of objects including, for example, a generator or a pump indicated schematically at 16.

The nozzle 12 is provided with hot gas from the outlet 20 of a vaporizing chamber 22. The vaporizing chamber 22 is associated with a vessel, generally designated 24, having a relatively narrow inlet 26 and a relatively narrow outlet 28 and a relatively wide, enlarged intermediate combustion chamber 30. As can be appreciated from the FIGURE, the vessel 24 is relatively thick walled so as to withstand the stresses and pressures placed on the same during operation.

At the narrow inlet 26, the vessel 24 is provided with a conventional fuel injector 32 which injects fuel through an orifice 34 into the combustion chamber 30. Concentrically about the fuel injector 32 is an annular oxidant admitting passage 36. Within the passage 36 at a plurality of angularly spaced locations, there are provided a plurality of oxidizer swirl vanes 38 and a suitable oxidant is provided to the annular space via, for example, an oxidant inlet 40. Oxidant to the inlet 40 is provided from an oxidant tank or supply 42. The oxidant may be any oxidant that will combust a carbonaceous fuel which may be supplied to the fuel injector 32 from a source of such fuel 44. Generally, but not always, the oxidant will be compressed air, compressed oxygen enriched air (air whose oxygen content has been increased above the usual 21%), or compressed oxygen.

Also included in the system is a conventional igniter 46 which extends to the interior of the combustion chamber 30 for igniting a mixture of fuel and oxidant therein.

According to the invention, at least at the radially outermost part of the interior surface 48 of the vessel 24, there is provided a heat shield 50. In a preferred embodiment, the heat shield 50 is formed of a ceramic material provided as a layer upon the interior surface 48 of the vessel 24. If desired, the ceramic layer 50 could have a different axial length than that illustrated in the FIGURE. For example, the axial length of the layer 50 could be increased.

The exterior surface 52 of the vessel 24 is wrapped with tubing 54 which may be brazed or otherwise bonded in good heat exchange contact with the exterior surface 52.

At the outlet 28, an axial discharge port 56 is provided. In the embodiment illustrated, the fuel discharge port 56 is the end of a somewhat J-shaped tube 58 which exits the vessel 24 at the outlet 28. However, if desired, the discharge port 58 could be the end of a tube extending along the axis of the vessel entirely through the same to the inlet end 26 thereof.

At or about the discharge port 56, the interior of the outlet is provided with a venturi forming surface 60. The outlet 26 then opens to the vaporizing chamber 22 which may be in any desired form or in any of the forms disclosed in the previously identified Perrin patent.

In normal operation, fuel is injected from the fuel injector 32 into the combustion chamber 30 to be ignited by the igniter 46 as it combines with oxidant swirling about the injected fuel and entering through the passage 36. Preferably, to prevent the existence of hot spots, something other than a stoichiometric mixture of fuel and oxidant is admitted to the combustion chamber 30, there being an excess of fuel so as to assure that all of the oxidant is consumed within the combustion chamber 30.

The hot gases leave the combustion chamber 30 through the outlet 28. Fuel to be vaporized is injected into the outlet at the area of the venturi surface 60 from the fuel discharge port 56. Because of the high velocity at the outlet 28 resulting from the presence of the venturi 60, good heat exchange and mixing will occur between the fuel discharged from the port 56 and the combustion gases leaving the combustion chamber 30 The fuel will not burn because the oxidant has been totally consumed, but the same will be vaporized, greatly increasing the volume of hot gas generated. This vaporizing will occur within the vaporizing chamber 22 and will serve to reduce the temperature of the gas to a suitable value at or below the maximum turbine inlet temperature.

The heat shield 50 may be formed by spraying on the wall 48 but in any event, its purpose is to protect the wall 48 from the heat generated as a result of combustion occurring within the chamber 30. At the same time, the radially inner surface 62 of the heat shield 50 will be capable of operating continuously at an elevated temperature that is sufficiently high to prevent the deposition of carbon thereon, i.e., sufficiently high to prevent carbon build-up.

To further assist in preventing the build-up of carbon, the vessel 24 in the vicinity of the combustion chamber 30 is cooled by a coolant flowing through the tubing 54. As noted previously, one possible coolant is fuel which is retained within the system, either being injected by the fuel injector 32 or through the fuel port 56, or both, after being heated in the process of cooling the vessel 24 to minimize heat rejection and to conserve energy. By locating the fluid flow path for the coolant on the exterior surface of the relatively thick walled vessel 24, adequately cooling for the vessel 24 is provided but yet the interior surface 48 thereof, and areas not protected by the hat shield 62, may still operate at relatively high temperatures to minimize carbon build-up. This is in contrast to a system such as that illustrated by Perrin wherein the cooling tubes are located on the interior of the vessel and thus provide relatively cool surfaces that disadvantageously encourage carbon build-up.

From the foregoing, it will be appreciated that a hot gas generator made according to the invention is ideally suited for use in those applications requiring the generation of hot gas and wherein carbon build-up is undesirable. It is particularly well suited for use in turbine applications since the elimination of carbon build-up avoids nozzle and turbine wheel erosion as well as a possible cause of surge.

I claim:

1. A hot gas generator comprising:
   a vessel having a narrow inlet end, a narrow outlet end and an intermediate, relatively wide, combustion chamber;
   means at said inlet end for introducing a carbonaceous fuel to be combusted into said combustion chamber generally axially of said vessel;
   an oxidant inlet port concentric with and disposed about said fuel introducing means;
   an axial fuel discharge port concentric with said narrow outlet end and downstream of said wide combustion chamber for introducing a fuel to be vaporized into said outlet and whereby such fuel is vaporized by hot gases of combustion exiting from said combustion chamber; and
   a heat shield at least partially lining the interior of said combustion chamber, said heat shield protecting said vessel from excessive heat from combustion of fuel within said chamber while presenting a surface to said chamber capable of sustained operation at temperatures sufficiently high to prevent carbon build up within said vessel.

2. THe hot gas generator of claim 1 wherein said heat shield comprises a layer of ceramic material on the interior surface of said vessel within said chamber.

3. A hot gas generator comprising:
a vessel having a narrow inlet end, a narrow outlet end and an intermediate, relatively wide, combustion chamber;
means at said inlet end for introducing a fuel to be combusted into said combustion chamber generally axially of said vessel;
a venturi in said narrow outlet end;
an oxidant inlet port concentric with and disposed about said fuel introducing means;
a fuel discharge port in and concentric with said outlet end for introducing a fuel to be vaporized into said venturi whereby such fuel is vaporized by hot gases of combustion exiting from said combustion chamber;
a heat shield at least partially lining the interior of said combustion chamber;
means on the exterior surface of said vessel defining a flow path for a coolant for said vessel;
said cooling means and said heat shield serving to prevent damage to said vessel by heat from the combustion of fuel within said chamber yet providing an interior surface within said vessel capable of operating at temperatures sufficiently high to prevent carbon build-up within said vessel.

4. The hot gas generator of claim 3 wherein said heat shield comprises a layer of ceramic material on the interior surface of said vessel within said chamber.

5. The hot gas generator of claim 3 wherein said flow path defining means comprises tubing wrapped around and in good heat exchanger contact with said exterior surface.

6. The hot gas generator of claim 3 wherein said heat shield comprises a layer of ceramic material on the interior surface of said vessel within said chamber, and said flow path defining means comprises tubing wrapped around and in good heat exchange contact with said exterior surface.

7. The hot gas generator of claim 6 in combination with a turbine wheel, said vessel outlet being in fluid communication with said turbine wheel to provide hot gas thereto to drive.the same.

* * * * *